(12) United States Patent
Chen

(10) Patent No.: US 7,641,213 B1
(45) Date of Patent: Jan. 5, 2010

(54) BICYCLE TRAINING WHEEL ASSEMBLY HAVING A TENSION ADJUSTABLE FUNCTION

(75) Inventor: Yu-Gang Chen, Sinshih Township, Tainan County (TW)

(73) Assignees: Shohu Mao Industrial Co., Ltd., Changhua County (TW); Far East Univerity, Tainan County (TW)

( * ) Notice: Subject to any disclaimer, the term of this patent is extended or adjusted under 35 U.S.C. 154(b) by 210 days.

(21) Appl. No.: 11/775,555

(22) Filed: Jul. 10, 2007

(51) Int. Cl.
*B62J 15/00* (2006.01)
(52) U.S. Cl. ...................................... 280/293; 280/301
(58) Field of Classification Search ................. 280/293, 280/301, 303
See application file for complete search history.

(56) References Cited

U.S. PATENT DOCUMENTS

| | | | | |
|---|---|---|---|---|
| 3,877,727 A | * | 4/1975 | Johannsen | 280/301 |
| 4,326,729 A | * | 4/1982 | Luckowski et al. | 280/304 |
| 4,810,000 A | * | 3/1989 | Saunders | 280/293 |
| 5,064,213 A | * | 11/1991 | Storch | 280/301 |
| 5,100,163 A | * | 3/1992 | Egley et al. | 280/293 |
| 5,352,403 A | * | 10/1994 | Egley | 280/293 |
| 6,318,745 B1 | * | 11/2001 | Sharp, III | 280/303 |
| 6,331,012 B1 | * | 12/2001 | Eisenmann et al. | 280/293 |

* cited by examiner

*Primary Examiner*—Kevin Hurley
(74) *Attorney, Agent, or Firm*—Alan Kamrath; Kamrath & Associates PA

(57) ABSTRACT

A training wheel assembly for a bicycle includes an upright support bracket mounted on a frame, a first pivot arm pivotally mounted on the support bracket, a training wheel rotatably mounted on the first pivot arm, a second pivot arm pivotally mounted on the support bracket, and an adjusting mechanism mounted between the first pivot arm and the second pivot arm to adjust a movable allowance or relative position between the first pivot arm and the second pivot arm. Thus, each of the training wheels is movable upward to leave the ground or downward to contact the ground so that the user needs not to remove the training wheels from the frame of the bicycle when not in used, thereby facilitating the user operating the training wheel assembly.

14 Claims, 10 Drawing Sheets

BICYCLE TRAINING WHEEL ASSEMBLY HAVING A TENSION ADJUSTABLE FUNCTION

BACKGROUND OF THE INVENTION

1. Field of the Invention

The present invention relates to a training wheel assembly and, more particularly, to a training wheel assembly for a bicycle.

2. Description of the Related Art

A conventional training wheel assembly for a bicycle in accordance comprises two support brackets mounted on two opposite sides of a frame of a bicycle and two training wheels each rotatably mounted on a respective support bracket. Thus, the training wheels are rested on the ground to facilitate a user practicing riding the bicycle. However, the support brackets are easily loosened from the frame of the bicycle during a long-term utilization, so that the training wheels cannot rest on the ground snugly. In addition, each of the support brackets has a fixed angle so that the angle and position of each of the training wheels are fixed and cannot be adjusted to fit a user's requirement. Further, each of the training wheels has a greater stiffness so that the bicycle easily topples when turning around, thereby causing danger to the user. Further, the user needs to remove the support brackets from the frame of the bicycle when not in user, thereby causing inconvenience to the user.

BRIEF SUMMARY OF THE INVENTION

In accordance with one embodiment of the present invention, there is provided a training wheel assembly, comprising an upright support bracket having an upper end mounted on a frame, a pivot arm having a first end pivotally mounted on a lower end of the support bracket, a training wheel rotatably mounted on a second end of the pivot arm, and an adjusting mechanism mounted between the support bracket and the pivot arm to adjust a movable allowance or relative position between the support bracket and the pivot arm.

In accordance with another embodiment of the present invention, there is provided training wheel assembly, comprising an upright support bracket having an upper end mounted on a frame, a first pivot arm having a first end pivotally mounted on a lower end of the support bracket, a training wheel rotatably mounted on a second end of the first pivot arm, a second pivot arm having a first end pivotally mounted on the upper end of the support bracket, and an adjusting mechanism mounted between the first pivot arm and the second pivot arm to adjust a movable allowance or relative position between the first pivot arm and the second pivot arm.

The primary objective of the present invention is to provide a bicycle training wheel assembly having a tension adjustable function.

Another objective of the present invention is to provide a training wheel assembly, wherein each of the training wheels can be rested on the ground to support the frame of the bicycle to facilitate a user practicing riding the bicycle.

A further objective of the present invention is to provide a training wheel assembly, wherein each of the training wheels is movable upward to leave the ground or downward to contact the ground so that the user needs not to remove the training wheels from the frame of the bicycle when not in used, thereby facilitating the user operating the training wheel assembly.

A further objective of the present invention is to provide a training wheel assembly, wherein the stiffness adjusting member provides a cushion in case of toppling to cause a comfortable sensation to the user and to protect the user's safety.

A further objective of the present invention is to provide a training wheel assembly, wherein the stiffness of each of the training wheels can be adjusted by adjusting the tension of the stiffness adjusting member so as to fit the user's requirement.

A further objective of the present invention is to provide a training wheel assembly, wherein either of the training wheels can be lifted independently to practice the balance gradually.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
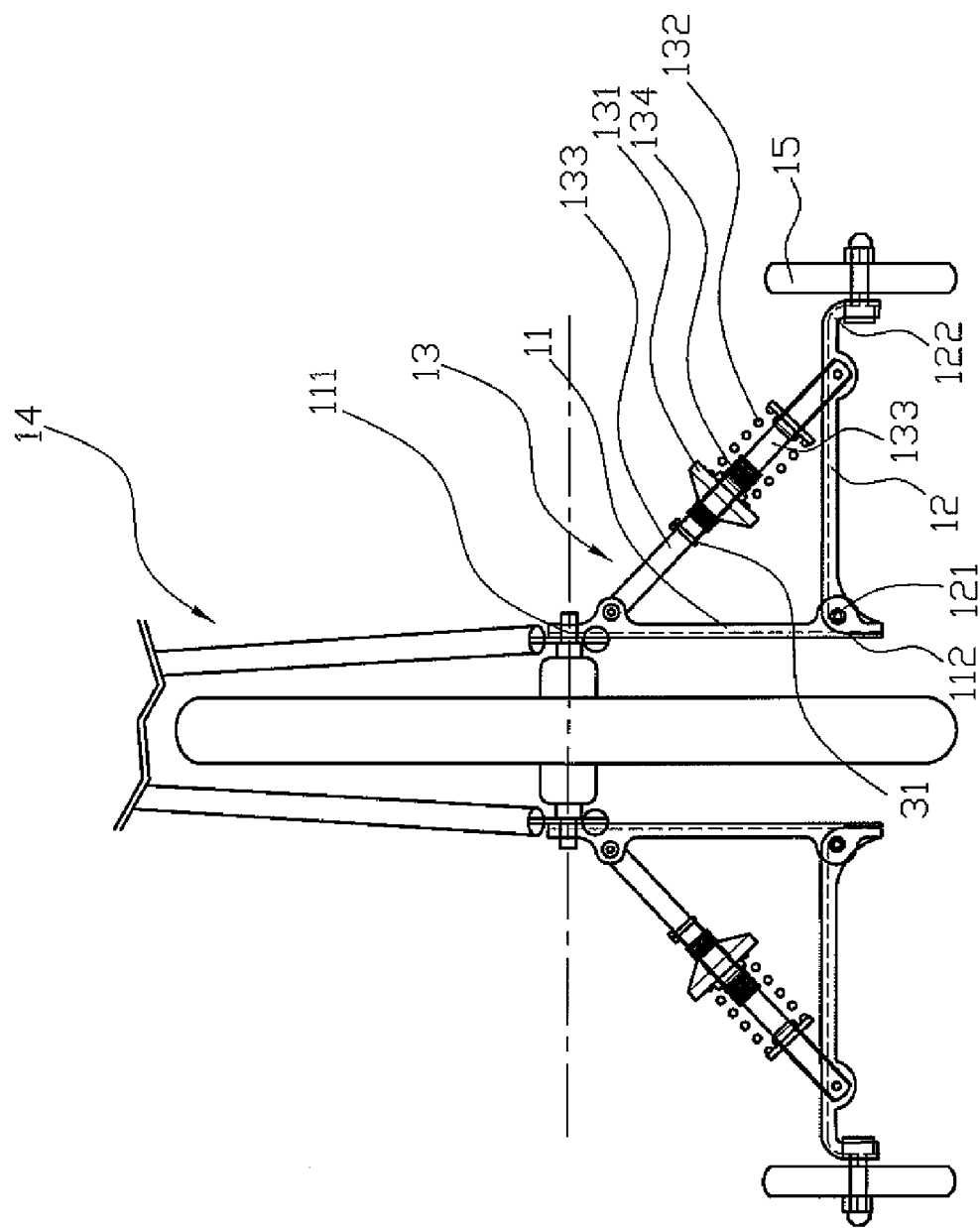
FIG. 1 is a front view of a training wheel assembly in accordance with the preferred embodiment of the present invention.

Referring to the drawings and initially to FIG. 1, a training wheel assembly for a bicycle in accordance with the preferred embodiment of the present invention is mounted on each of two opposite sides of a frame 14 of a bicycle and comprises an upright support bracket 11 having an upper end 111 mounted on the frame 14 of the bicycle, a first pivot arm 12 having a first end 121 pivotally mounted on a lower end 112 of the support bracket 11, a training wheel 15 rotatably mounted on a second end 122 of the first pivot arm 12, and an adjusting mechanism 13 mounted between the support bracket 11 and the first pivot arm 12 to adjust a movable allowance or relative position between the support bracket 11 and the first pivot arm 12.

The adjusting mechanism 13 includes two telescopically arranged adjusting tubes 133 mounted between the support bracket 11 and the first pivot arm 12, a stiffness adjusting member 132 biased between the adjusting tubes 133 and a control member 131 movably mounted between the adjusting tubes 133 and urged on the stiffness adjusting member 132.

Thus, the control member 131 of the adjusting mechanism 13 is used to adjust an allowance of the stiffness adjusting member 132 of the adjusting mechanism 13 so as to adjust the movable allowance between the support bracket 11 and the first pivot arm 12 or to adjust a relative position between the adjusting tubes 133 of the adjusting mechanism 13 so as to adjust the relative position between the support bracket 11 and the first pivot arm 12.

Preferably, the control member 131 of the adjusting mechanism 13 can adjust the allowance of the stiffness adjusting member 132 of the adjusting mechanism 13 and adjust the relative position between the adjusting tubes 133 of the adjusting mechanism 13 by provision of threadings 134 formed on the adjusting tubes 133 of the adjusting mechanism 13.

In the preferred embodiment of the present invention, the stiffness adjusting member 132 of the adjusting mechanism 13 is a spring or cylinder. In addition, the adjusting tubes 133 of the adjusting mechanism 13 have a first portion pivotally mounted on the upper end 111 of the support bracket 11 and a second portion pivotally mounted on the first pivot arm 12 and located between the first end 121 of the first pivot arm 12 and the training wheel 15. Preferably, the second portion of the adjusting tubes 133 of the adjusting mechanism 13 is located closer to the training wheel 15 than the first end 121 of the first pivot arm 12.

The training wheel assembly further comprises a pin 31 mounted between the adjusting tubes 133 of the adjusting mechanism 13 to limit a movable allowance between the adjusting tubes 133 of the adjusting mechanism 13.

Figure 2:
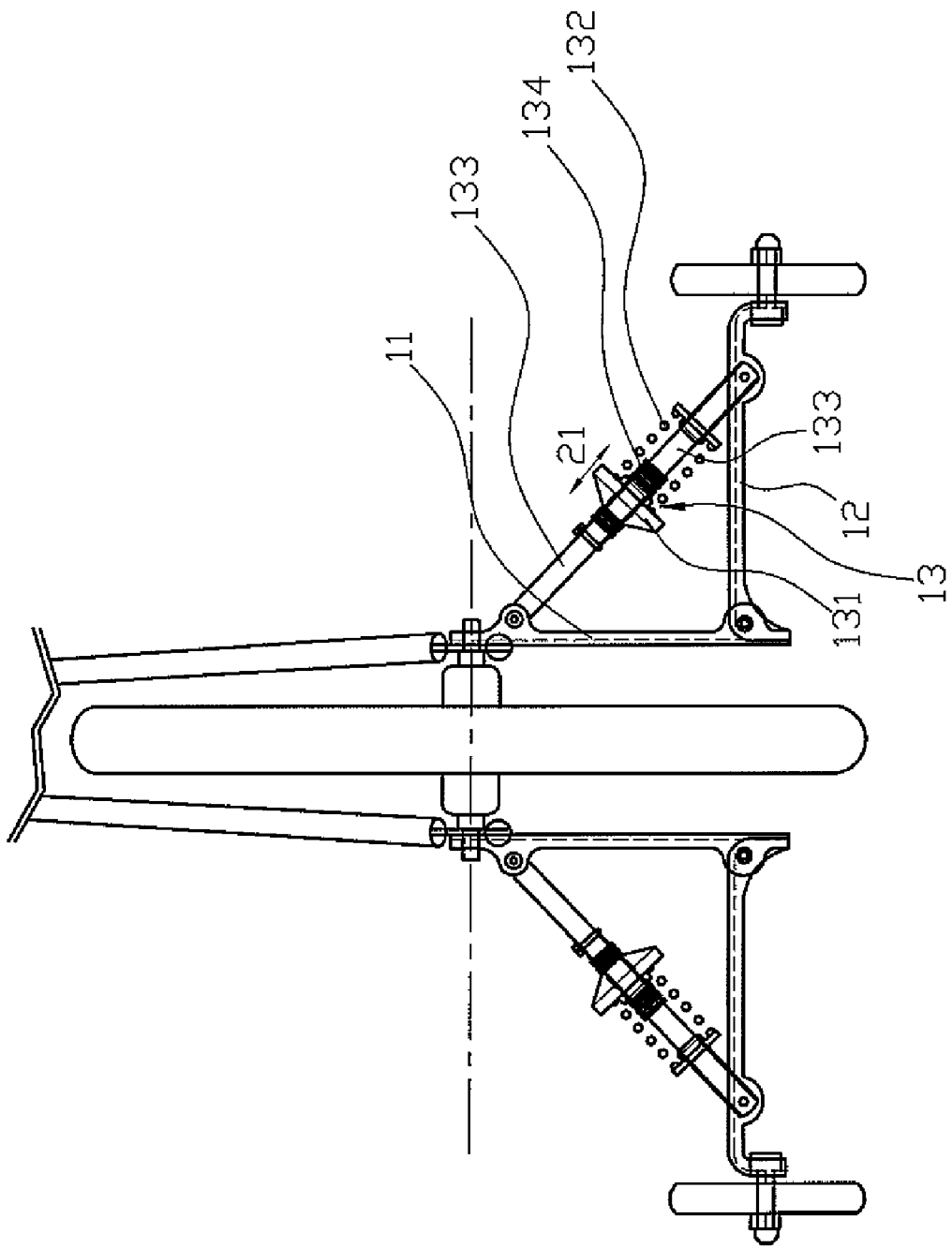
FIG. 2 is a schematic operational view of the training wheel assembly as shown in FIG. 1.

As shown in FIG. 2, the control member 131 of the adjusting mechanism 13 is rotatable and movable upward or downward on the adjusting tubes 133 of the adjusting mechanism 13 in the direction as indicated by the numeral 21 to adjust the allowance of the stiffness adjusting member 132 of the adjusting mechanism 13 so as to adjust the movable allowance between the support bracket 11 and the first pivot arm 12.

Figure 3:
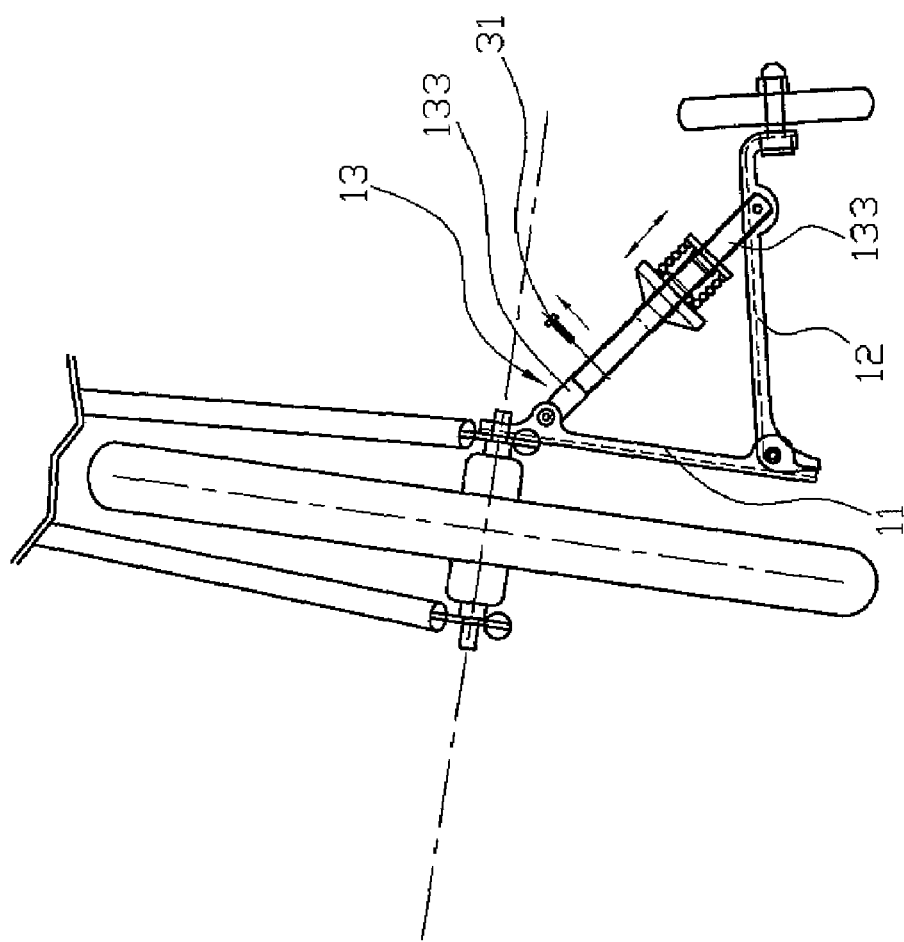
FIG. 3 is a schematic operational view of the training wheel assembly as shown in FIG. 1.

As shown in FIG. 3, the pin 31 is removable from the adjusting tubes 133 of the adjusting mechanism 13 to release a limit of the movable allowance between the adjusting tubes 133 of the adjusting mechanism 13 so that the movable allowance between the support bracket 11 and the first pivot arm 12 reaches the maximum value.

Figure 4:
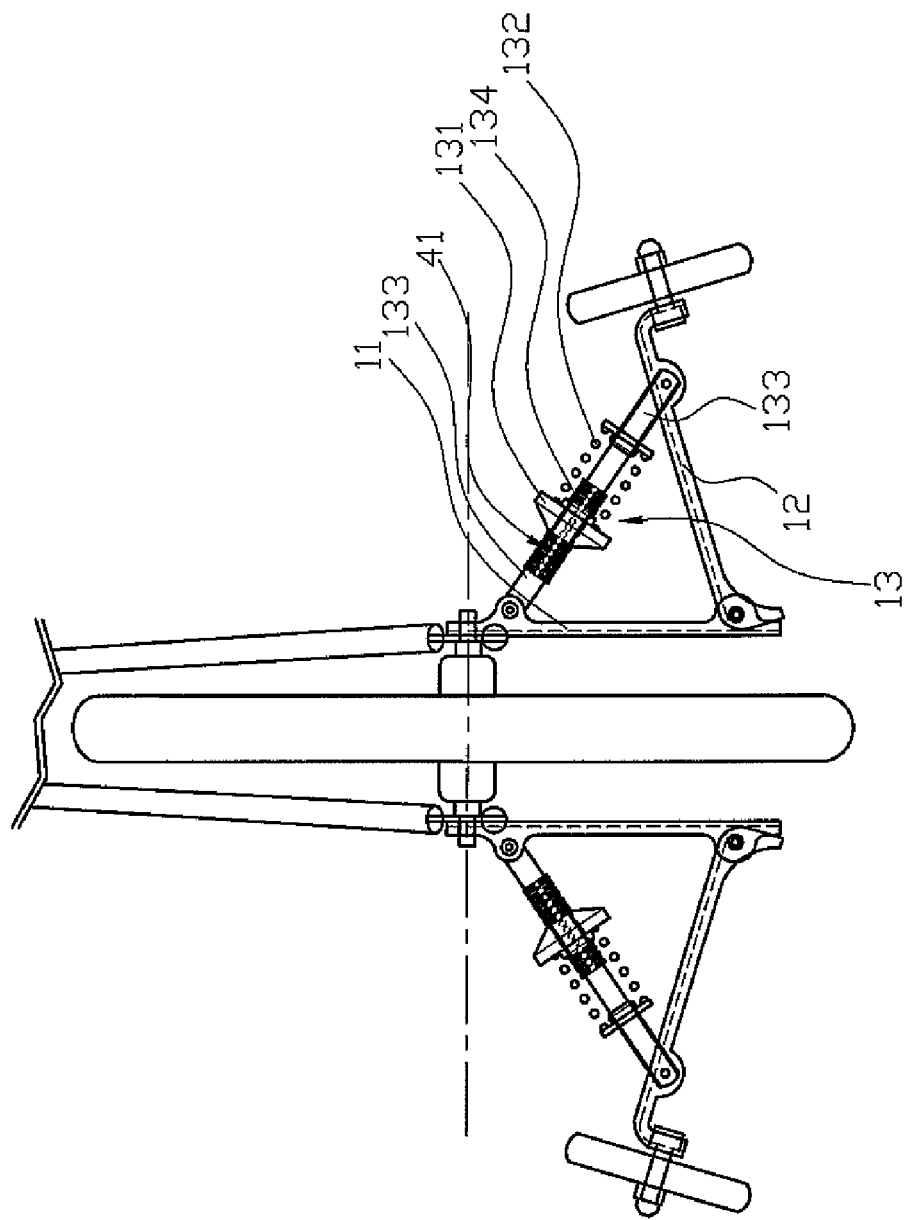
FIG. 4 is a front view of a training wheel assembly in accordance with another preferred embodiment of the present invention.

As shown in FIG. 4, the adjusting tubes 133 of the adjusting mechanism 13 are formed with a plurality of adjusting holes 41 to allow insertion of the pin 31 (see FIG. 3) to adjust the movable allowance between the adjusting tubes 133 of the adjusting mechanism 13.

Figure 5:
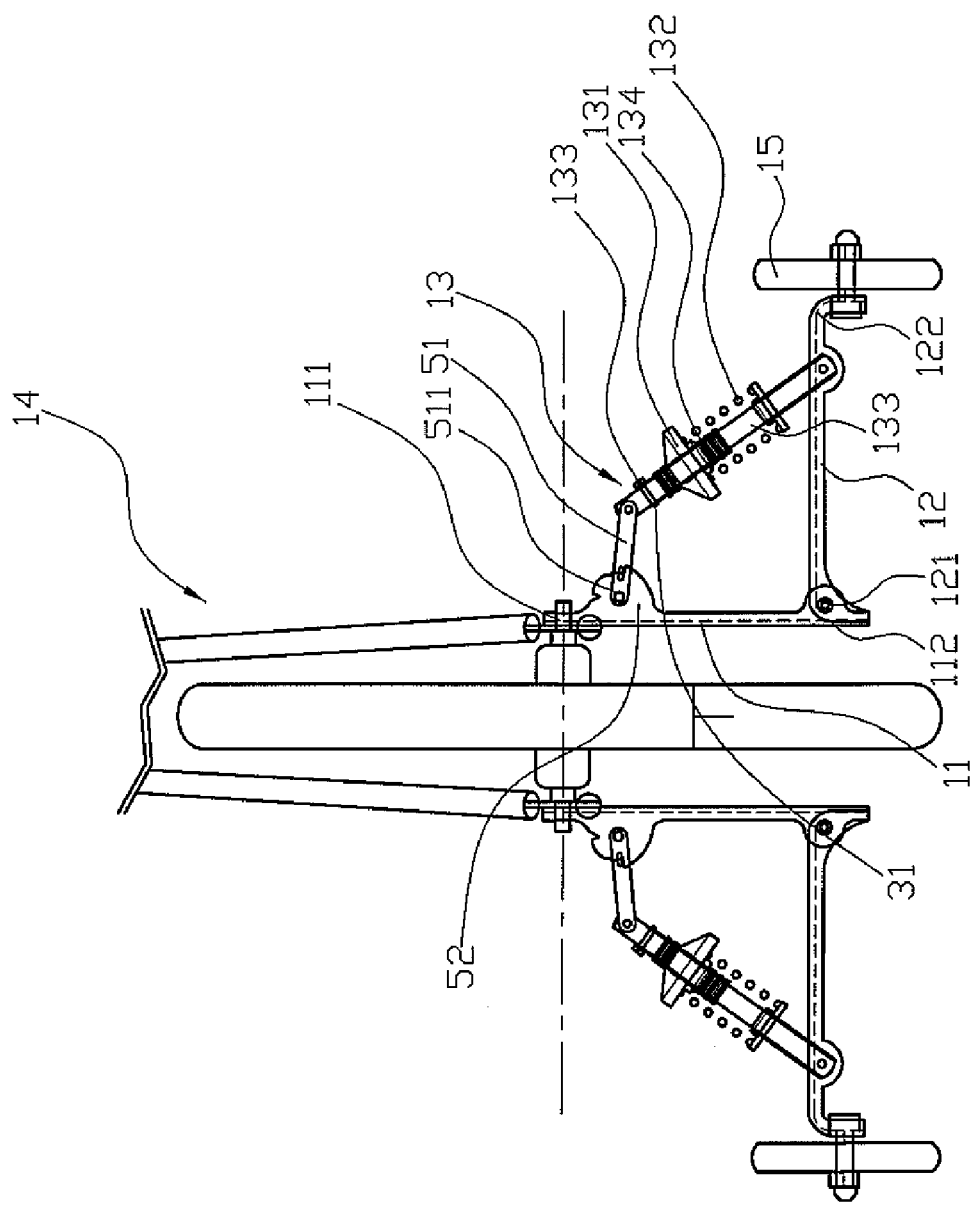
FIG. 5 is a front view of a training wheel assembly in accordance with another preferred embodiment of the present invention.

Referring to FIG. 5, a training wheel assembly for a bicycle in accordance with another preferred embodiment of the present invention is mounted on each of two opposite sides of a frame 14 of a bicycle and comprises an upright support bracket 11 having an upper end 111 mounted on the frame 14 of the bicycle, a first pivot arm 12 having a first end 121 pivotally mounted on a lower end 112 of the support bracket 11, a training wheel 15 rotatably mounted on a second end 122 of the first pivot arm 12, a second pivot arm 51 having a first end 511 pivotally mounted on the upper end 111 of the support bracket 11, and an adjusting mechanism 13 mounted between the first pivot arm 12 and the second pivot arm 51 to adjust a movable allowance or relative position between the first pivot arm 12 and the second pivot arm 51.

The upper end 111 of the support bracket 11 is formed with an outwardly protruding pivot seat 52, and the first end 511 of the second pivot arm 51 is pivotally mounted on the pivot seat 52 of the support bracket 11.

The adjusting mechanism 13 includes two telescopically arranged adjusting tubes 133 mounted between the first pivot arm 12 and the second pivot arm 51, a stiffness adjusting member 132 biased between the adjusting tubes 133 and a control member 131 movably mounted between the adjusting tubes 133 and urged on the stiffness adjusting member 132.

Thus, the control member 131 of the adjusting mechanism 13 is used to adjust an allowance of the stiffness adjusting member 132 of the adjusting mechanism 13 so as to adjust the movable allowance between the first pivot arm 12 and the second pivot arm 51 or to adjust a relative position between the adjusting tubes 133 of the adjusting mechanism 13 so as to adjust the relative position between the first pivot arm 12 and the second pivot arm 51.

Preferably, the control member 131 of the adjusting mechanism 13 can adjust the allowance of the stiffness adjusting member 132 of the adjusting mechanism 13 and adjust the relative position between the adjusting tubes 133 of the adjusting mechanism 13 by provision of threadings 134 formed on the adjusting tubes 133 of the adjusting mechanism 13.

In the preferred embodiment of the present invention, the stiffness adjusting member 132 of the adjusting mechanism 13 is a spring or cylinder. In addition, the adjusting tubes 133 of the adjusting mechanism 13 have a first portion pivotally mounted on a second end of the second pivot arm 51 and a second portion pivotally mounted on the first pivot arm 12 and located between the first end 121 of the first pivot arm 12 and the training wheel 15. Preferably, the second portion of the adjusting tubes 133 of the adjusting mechanism 13 is located closer to the training wheel 15 than the first end 121 of the first pivot arm 12.

The training wheel assembly further comprises a pin 31 mounted between the adjusting tubes 133 of the adjusting mechanism 13 to limit a movable allowance between the adjusting tubes 133 of the adjusting mechanism 13.

Figure 6:
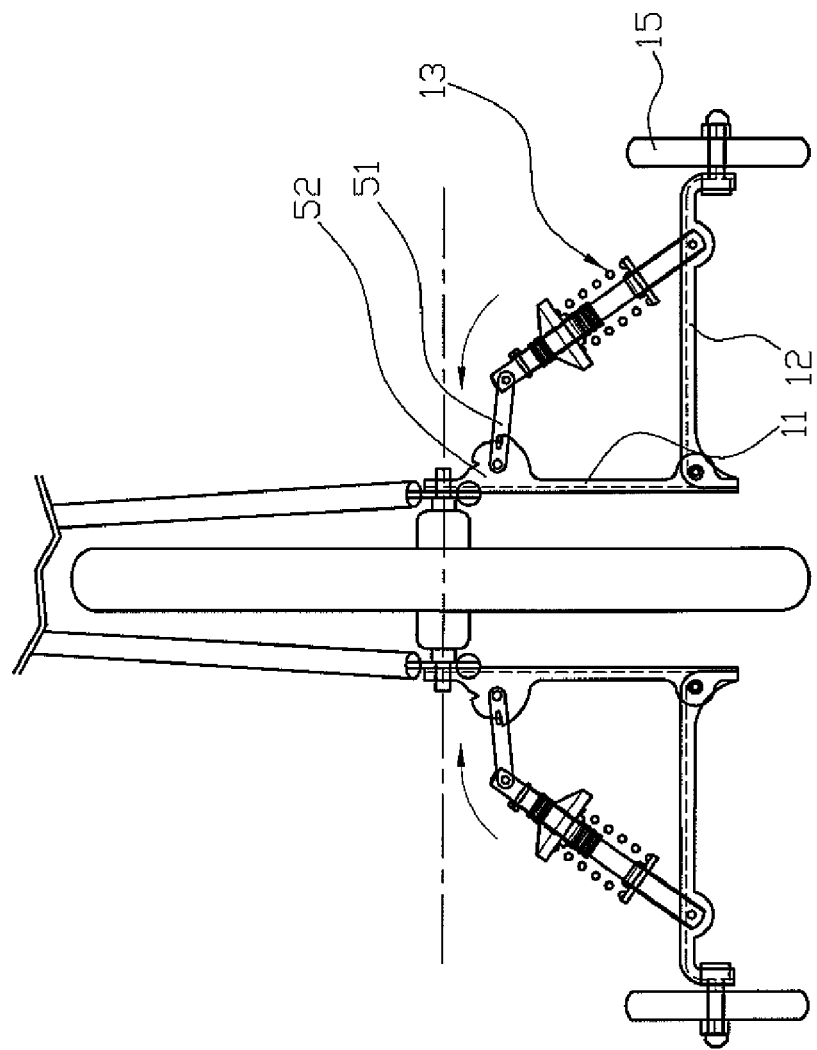
FIG. 6 is a schematic operational view of the training wheel assembly as shown in FIG. 5.
Figure 7:
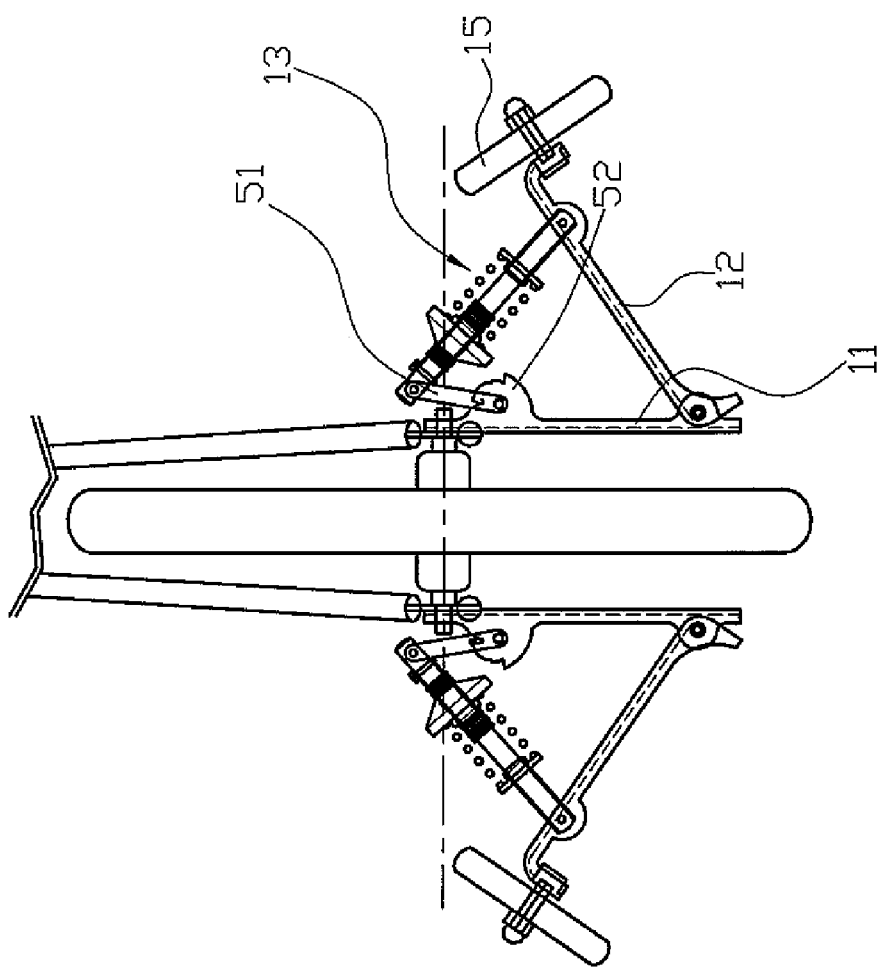
FIG. 7 is a schematic operational view of the training wheel assembly as shown in FIG. 6.

As shown in FIGS. 6 and 7, the second pivot arm 51 is pivotable relative to the pivot seat 52 of the support bracket 11 to move the adjusting mechanism 13 which moves the first pivot arm 12 so that the first pivot arm 12 is pivotable relative to the support bracket 11 to move the training wheel 15 upward to leave the ground or downward to contact the ground.

Figure 8:
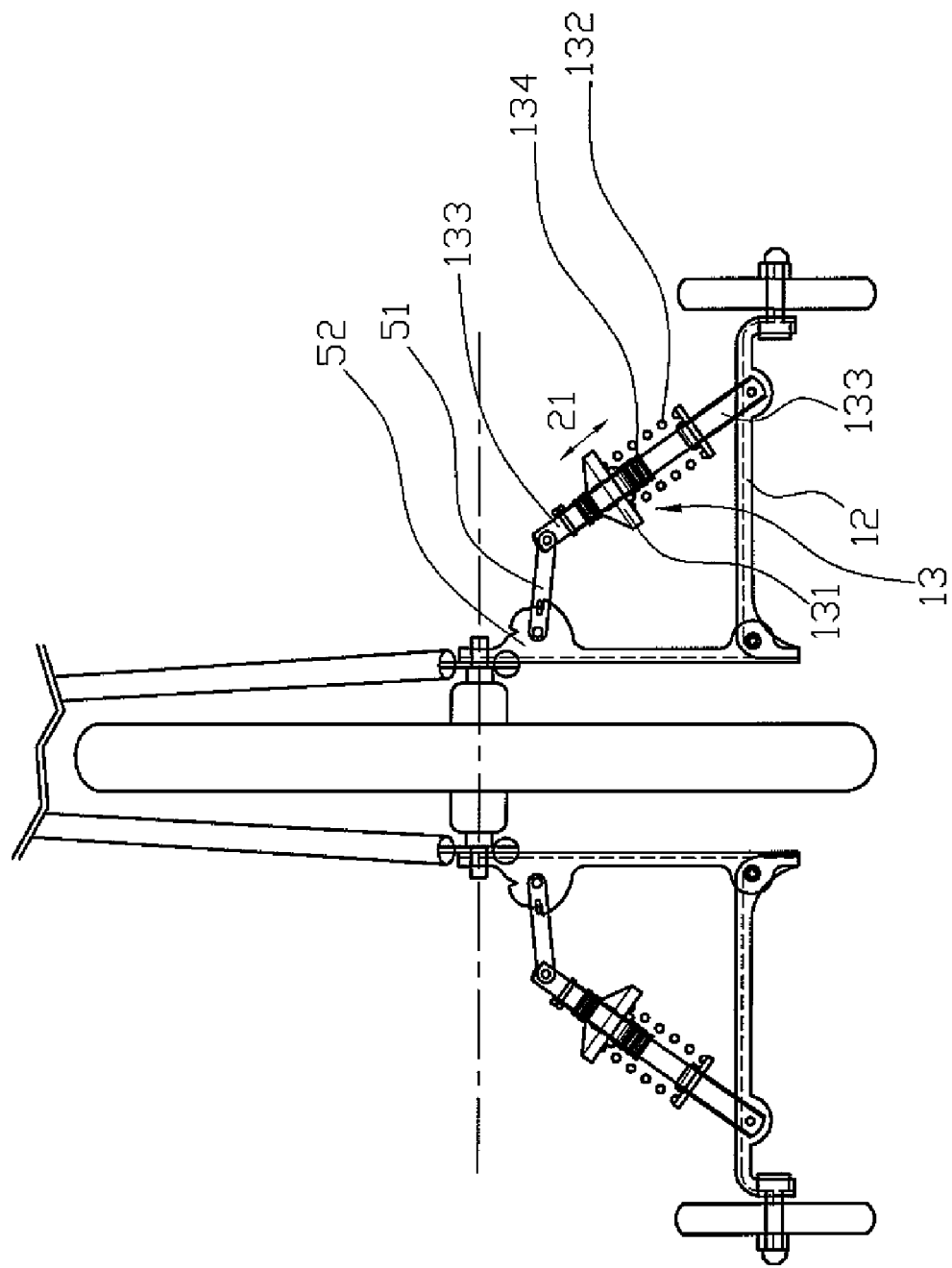
FIG. 8 is a schematic operational view of the training wheel assembly as shown in FIG. 5.

As shown in FIG. 8, the control member 131 of the adjusting mechanism 13 is rotatable and movable upward or downward on the adjusting tubes 133 of the adjusting mechanism 13 in the direction as indicated by the numeral 21 to adjust the allowance of the stiffness adjusting member 132 of the adjusting mechanism 13 so as to adjust the movable allowance between the first pivot arm 12 and the second pivot arm 51.

Figure 9:
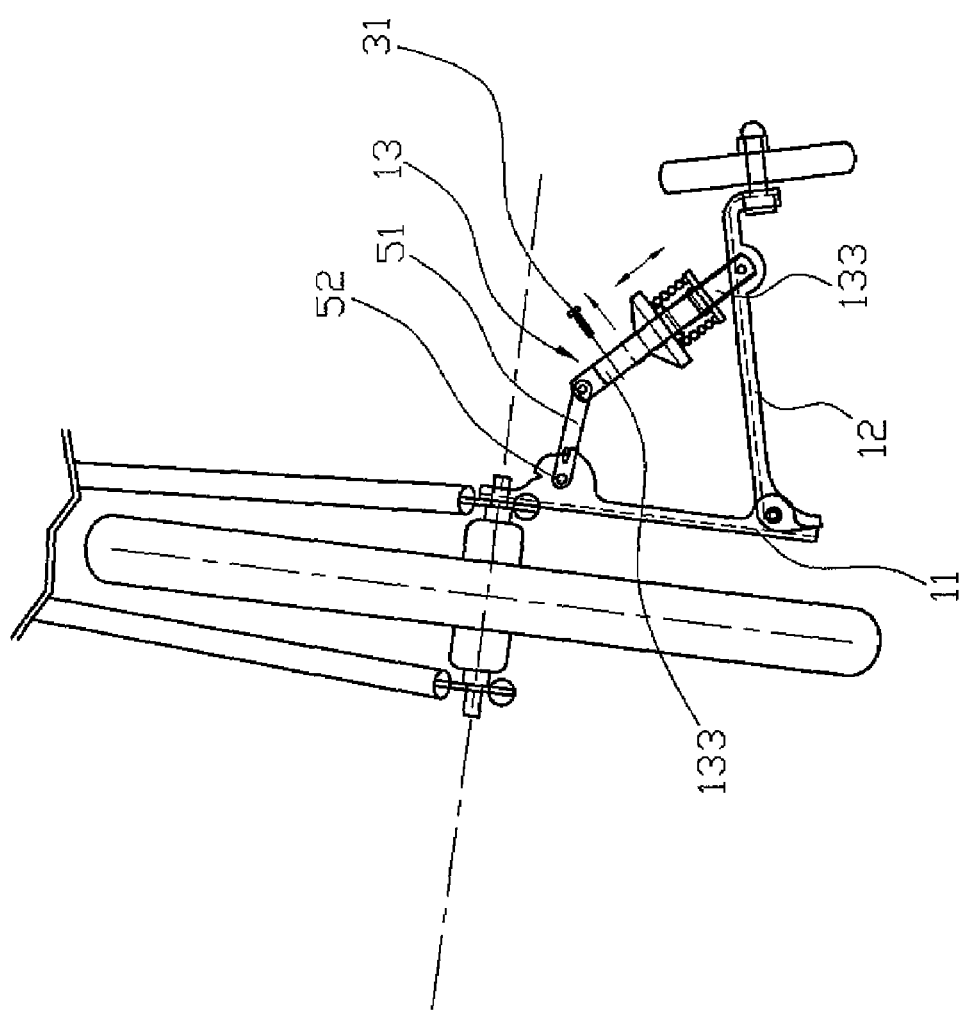
FIG. 9 is a schematic operational view of the training wheel assembly as shown in FIG. 5.

As shown in FIG. 9, the pin 31 is removable from the adjusting tubes 133 of the adjusting mechanism 13 to release a limit of the movable allowance between the adjusting tubes 133 of the adjusting mechanism 13 so that the movable allowance between the first pivot arm 12 and the second pivot arm 51 reaches the maximum value.

Figure 10:
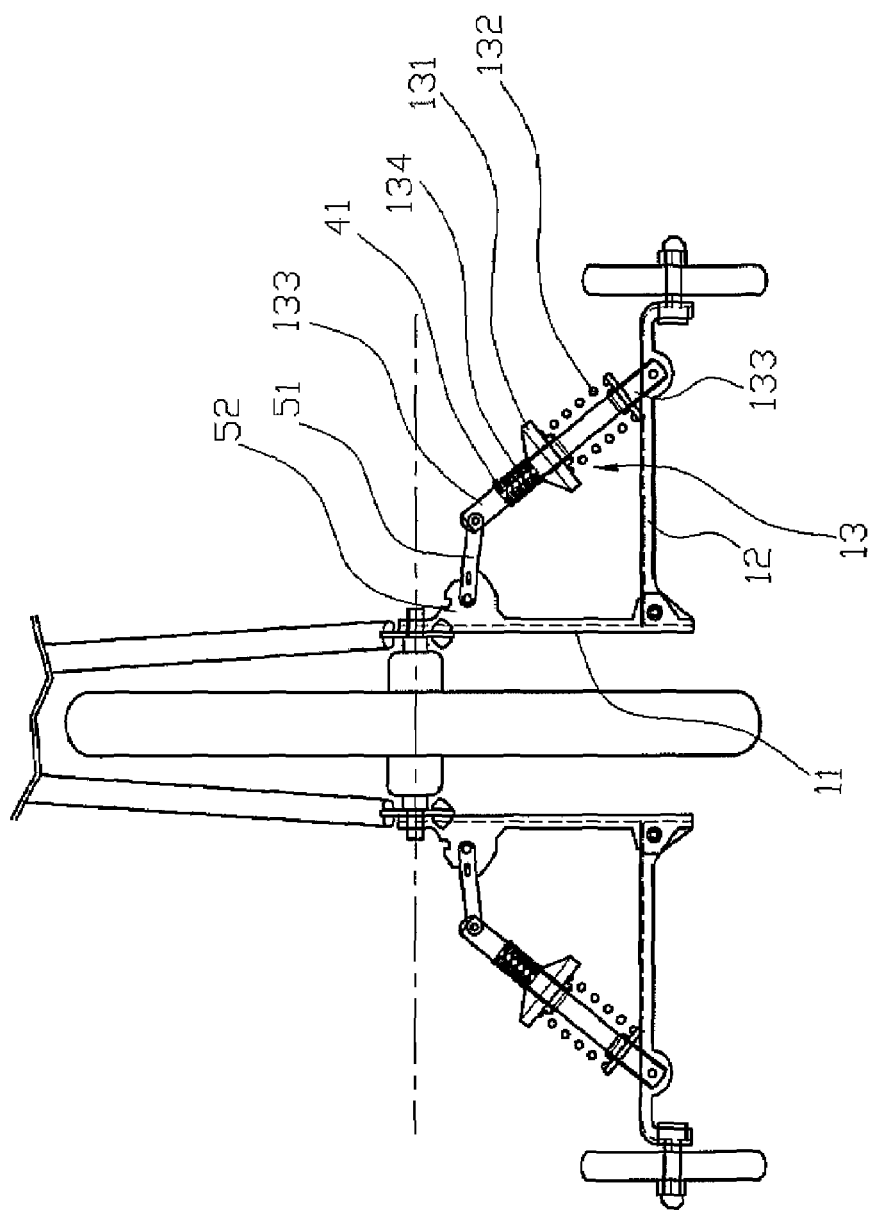
FIG. 10 is a front view of a training wheel assembly in accordance with another preferred embodiment of the present invention.

As shown in FIG. 10, the adjusting tubes 133 of the adjusting mechanism 13 are formed with a plurality of adjusting holes 41 to allow insertion of the pin 31 (see FIG. 9) to adjust the movable allowance between the adjusting tubes 133 of the adjusting mechanism 13.

Accordingly, each of the training wheels 15 can be rested on the ground to support the frame 14 of the bicycle to facilitate a user practicing riding the bicycle. In addition, each of the training wheels 15 is movable upward to leave the ground or downward to contact the ground so that the user needs not to remove the training wheels 15 from the frame 14 of the bicycle when not in used, thereby facilitating the user operating the training wheel assembly. Further, the stiffness adjusting member 132 provides a cushion in case of toppling to cause a comfortable sensation to the user and to protect the user's safety. Further, the stiffness of each of the training wheels 15 can be adjusted by adjusting the tension of the stiffness adjusting member 132 so as to fit the user's requirement. Further, either of the training wheels 15 can be lifted independently to practice the balance gradually.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A training wheel assembly, comprising:
    an upright support bracket having an upper end mounted on a frame;
    a pivot arm having a first end pivotally mounted on a lower end of the support bracket;
    a training wheel rotatably mounted on a second end of the pivot arm;
    an adjusting mechanism mounted between the support bracket and the pivot arm to adjust a movable allowance or relative position between the support bracket and the pivot arm;
    wherein the adjusting mechanism includes:
    two telescopically arranged adjusting tubes mounted between the support bracket and the pivot arm;
    a stiffness adjusting member biased between the adjusting tubes;
    a control member movably mounted between the adjusting tubes and urged on the stiffness adjusting member;
    the training wheel assembly further comprises a pin mounted between the adjusting tubes of the adjusting mechanism to limit a movable allowance between the adjusting tubes of the adjusting mechanism.

2. The training wheel assembly in accordance with claim 1, wherein the control member of the adjusting mechanism is used to adjust an allowance of the stiffness adjusting member of the adjusting mechanism so as to adjust the movable allowance between the support bracket and the pivot arm or to adjust a relative position between the adjusting tubes of the adjusting mechanism so as to adjust the relative position between the support bracket and the pivot arm.

3. The training wheel assembly in accordance with claim 1, wherein the stiffness adjusting member of the adjusting mechanism is a spring or cylinder.

4. The training wheel assembly in accordance with claim 1, wherein the control member of the adjusting mechanism can adjust the allowance of the stiffness adjusting member of the adjusting mechanism and adjust the relative position between the adjusting tubes of the adjusting mechanism by provision of threadings formed on the adjusting tubes of the adjusting mechanism.

5. The training wheel assembly in accordance with claim 1, wherein the adjusting tubes of the adjusting mechanism have a first portion pivotally mounted on the upper end of the support bracket and a second portion pivotally mounted on the pivot arm and located between the first end of the pivot arm and the training wheel.

6. The training wheel assembly in accordance with claim 5, wherein the second portion of the adjusting tubes of the adjusting mechanism is located closer to the training wheel than the first end of the pivot arm.

7. A training wheel assembly, comprising:
    an upright support bracket having an upper end mounted on a frame;
    a first pivot arm having a first end pivotally mounted on a lower end of the support bracket;
    a training wheel rotatably mounted on a second end of the first pivot arm;
    a second pivot arm having a first end pivotally mounted on the upper end of the support bracket;
    an adjusting mechanism mounted between the first pivot arm and the second pivot arm to adjust a movable allowance or relative position between the first pivot arm and the second pivot arm;
    wherein the adjusting mechanism includes:
    two telescopically arranged adjusting tubes mounted between the first pivot arm and the second pivot arm;
    a stiffness adjusting member biased between the adjusting tubes;
    a control member movably mounted between the adjusting tubes and urged on the stiffness adjusting member.

8. The training wheel assembly in accordance with claim 7, wherein the control member of the adjusting mechanism is used to adjust an allowance of the stiffness adjusting member of the adjusting mechanism so as to adjust the movable allowance between the first pivot arm and the second pivot arm or to adjust a relative position between the adjusting tubes of the adjusting mechanism so as to adjust the relative position between the first pivot arm and the second pivot arm.

9. The training wheel assembly in accordance with claim 7, wherein the stiffness adjusting member of the adjusting mechanism is a spring or cylinder.

10. The training wheel assembly in accordance with claim 7, further comprises a pin mounted between the adjusting tubes of the adjusting mechanism to limit a movable allowance between the adjusting tubes of the adjusting mechanism.

11. The training wheel assembly in accordance with claim 7, wherein the control member of the adjusting mechanism can adjust the allowance of the stiffness adjusting member of the adjusting mechanism and adjust the relative position between the adjusting tubes of the adjusting mechanism by provision of threadings formed on the adjusting tubes of the adjusting mechanism.

12. The training wheel assembly in accordance with claim 7, wherein the adjusting tubes of the adjusting mechanism have a first portion pivotally mounted on a second end of the second pivot arm and a second portion pivotally mounted on the first pivot arm and located between the first end of the first pivot arm and the training wheel.

13. The training wheel assembly in accordance with claim 12, wherein the second portion of the adjusting tubes of the adjusting mechanism is located closer to the training wheel than the first end of the first pivot arm.

14. The training wheel assembly in accordance with claim 7, wherein:
    the upper end of the support bracket is formed with an outwardly protruding pivot seat;
    the first end of the second pivot arm is pivotally mounted on the pivot seat of the support bracket.

\* \* \* \* \*